United States Patent [19]

Imaide et al.

[11] Patent Number: 4,959,727
[45] Date of Patent: Sep. 25, 1990

[54] IMAGE PICK-UP APPARATUS

[75] Inventors: Takuya Imaide, Yokohama; Toshiro Kinugasa, Hiratsuka, both of Japan

[73] Assignee: Hitachi, Ltd., Tokyo, Japan

[21] Appl. No.: 360,408

[22] Filed: Jun. 2, 1989

[30] Foreign Application Priority Data

Jun. 3, 1988 [JP] Japan .................................. 63-135488

[51] Int. Cl.$^5$ .......................................... H04N 5/238
[52] U.S. Cl. ..................................... 358/228; 358/211
[58] Field of Search ........................ 358/228, 210–211, 358/213.19, 909

[56] References Cited

U.S. PATENT DOCUMENTS

| | | | |
|---|---|---|---|
| 4,739,411 | 4/1988 | Bolton | 358/228 |
| 4,746,988 | 5/1988 | Nutting et al. | 358/228 |
| 4,780,766 | 10/1988 | Nutting | 358/228 |
| 4,868,667 | 9/1989 | Tani et al. | 358/228 |
| 4,894,723 | 1/1990 | Takaiwa | 358/228 |

Primary Examiner—Stephen Brinich
Attorney, Agent, or Firm—Antonelli, Terry, Stout & Kraus

[57] ABSTRACT

A video camera comprises an image sensor for converting a projected light image into an electrical signal, an exposure time setting circuit for setting the exposure time for the image sensor to either one of a normal exposure time and an exposure time longer than the normal exposure time, and an automatic gain control circuit including a variable gain amplifier for amplifying a video signal read out from the image sensor and a detector for detecting an output signal level of the variable gain amplifier and supplying a gain control signal based on the result of detection to the variable gain amplifier. The automatic gain control circuit is controlled so as to make the response speed of the automatic gain control circuit, when the exposure time is set to an exposure time longer than the normal exposure time, lower than that preset when the exposure time is set to the normal exposure time.

23 Claims, 11 Drawing Sheets

IMAGE PICK-UP APPARATUS

BACKGROUND OF THE INVENTION

The present invention relates to an image pick-up apparatus and particularly to a video camera in such a type as is capable of changing exposure time. Moreover the present invention also relates to a video camera which assures excellent usability.

It is not a rare case in a video camera to attempt variable control for the exposure time. Extended exposure time is discussed in Japanese Patent Application Laid-open No. 59-37778, while short exposure time in IEEE Transactions on Consumer Electronics, Vol. CE-33, No. 3 (August 1987), pp. 24-255.

Although there is no example of variable control for the exposure time in such a wide range from long exposure to high speed shutter, handling of camera may be complicated by allowing selection of variable exposure times and such video camera may be supposed to become an inconvenient machine for ordinary users. The latter literature discloses the concept of automatic exposure-time control limited only to a short-period exposure but does not refer to easiness in operation of buttons and convenience in operations for facilities. Moreover, the former document of long exposure also does not describe usability.

SUMMARY OF THE INVENTION

It is an object of the present invention to provide a video camera characterized in variable exposure times with excellent usability.

The above object is accomplished according to the present invention by providing an image pick-up apparatus which comprises an image sensor for converting a light image projected into an electrical signal, a signal level adjuster for adjusting a level of signal read out from the image sensor, a detector for detecting the level of signal read out from the image sensor and supplying an automatic level control signal based on the result of detection to the signal level adjuster so as to keep the level of signal read out from the image sensor at a predetermined value, an exposure time setting circuit capable of setting an exposure time for the image sensor to either one of a normal time and the other time longer than the normal time, and a circuit which, in case the exposure time is set to a time longer than the normal time, lowers a response speed of the signal level adjuster to the automatic level control signal supplied from the detector lower than that in case the normal time is set as the exposure time.

DETAILED DESCRIPTION OF THE INVENTION

According to the present invention, at least one of means described hereunder is introduced into a video camera which assures variable exposure times.

(1) Following facilities are provided for video camera together with automatic signal level control functions such as automatic iris control, automatic gain control and automatic white-balance control.

(1.1) Means for changing a response speed of automatic signal level control is provided to make slower the response speed of automatic signal level control during the long exposure.

(1.2) Means for sampling and holding signal level information for automatic iris control is provided to obtain continuous information by holding the signal level information obtained until the next readout operation during the intermittent readout operation under the long exposure.

(1.3) Means for detecting an F-number is provided to reduce the exposure time by detecting that the F-number has exceeded a predetermined value.

(2) Following facilities are provided for video camera together with the automatic control function of exposure time including long exposure.

(2.1) Means for detecting gain of the automatic gain control (hereinafter abbreviated as "AGC") is provided to control the exposure time depending on detection of gain of AGC in the automatic exposure time control mode.

(2.2) Means for changing the exposure time in unit of several Hs (here, "H" represents one horizontal scanning period) is provided to change the exposure time in unit of several Hs during the exposure time changing mode.

(3) Following facilities are provided to buttons or switches to be operated by users in order to enhance usability.

(3.1) A switch for changing over the long exposure mode for high sensitivity and short exposure mode for high-speed shutter and a push-switch for changing over the exposure times are provided and the push-switch for changing over the exposure times is used in common in both modes.

(3.2) The first exposure time after selection of mode of the high sensitivity mode or shutter mode should be nearest to one field period (namely, a normal exposure time) among the selectable exposure times. (Hereunder, the one field period is represented by "FP".)

The actions and effects of the means described above will be explained.

(1.1) In the long exposure, the signal read out from the image sensor appears intermittently. Therefore, oscillation must be prevented by lowering the response speed of automatic signal level control in comparison with that in the short exposure in which the signal can be obtained continuously from the image sensor. In case the response speed is set in compliance with the long exposure, the response speed in the short exposure becomes slower than that required and good output image can be obtained only after a certain period when the incident light changes. The present invention provides means for slowering the response of automatic signal level control only with the long exposure. Therefore, it responds to change of incident light in the ordinary outdoor image pick-up operation and malfunction such as oscillation does not occur even in the image pick-up operation with the long exposure.

(1.2) It is general for reducing quantization error to conduct A/D conversion after AGC control and gamma correction to supply the signal to a field memory or a frame memory but it is preferable for executing iris control in preference to the AGC control and realizing more accurate control to use the signal free from the AGC and gamma correction for signal detection (iris detection) for automatic iris control. Therefore, it is desirable to use a signal before interpolation by the field memory or the frame memory as the signal to be input to the iris detection. However, this signal becomes an intermittent signal during the long exposure. Accordingly, the iris detection output, in the case where the output signal of the predetermined standard level can be obtained, changes depending on the exposure time. As a result, the automatic iris control is carried out erroneously. In the present invention, the iris detection output in the period where the signal is read out from the image sensor is sampled and held, and is utilized as a iris control signal in the period where the signal is not read out from the image sensor. Thereby, an iris driver input signal in such a period that the output signal of standard level can be obtained can be kept constant without relation to the exposure time.

(1.3) When an intensive light enters in general causing an iris to stop down a lens to a range represented by the F-numbers 10 to 20, the lens is perfectly stopped down with only a small force of iris motor and thereby easily generates iris oscillation. In particular, since the lens is stopped down for the same amount of incident light as the exposure time is longer, the iris oscillation is generated more easily. For this problem, according to the present invention, it is detected that the F-number has exceeded the predetermined value and the exposure time is reduced so that the iris oscillation is prevented from occurrence.

(2.1) In the automatic exposure time control mode, when the object becomes dark and sufficient signal level can no longer be obtained, it is detected that the gain of AGC has exceeded the predetermined value and the exposure time is extended. Therefore, a signal-to-noise ratio can be improved automatically. On the contrary, when it is detected that the gain of AGC becomes lower than the predetermined value with the long exposure, the exposure time is shortened and therefore the resolution for a motion image is not deteriorated due to the exposure time longer than that required.

(2.2) Since means for changing exposure time in unit of several Hs changes over the exposure time in the automatic mode, such phenomena that the picture brightens and whitens too much or darkens too much can be prevented from occurring during changeover of the exposure time.

(3.1) The long exposure mode and the short exposure mode are exactly the same in such a point as changing the exposure time but since the application purposes by users for such modes are quite different, it can be supposed that operations by users may be simplified by providing a switch to change over such a couple of modes in accordance with the present invention. In this case, only one push switch or button is provided to change the exposure time in common use for both exposure modes. Accordingly, a number of switches may be saved and operations by users can also be simplified because only one switch is provided for "changing the exposure time".

(3.2) Since the first exposure time when the switch is changed for either of these exposure modes is nearest to FP among the selectable exposure times, the phenomena that the picture brightens and whitens too much or darkens too much can be minimized during transfer of modes. Moreover, even in case a slide switch is used as the mode selection switch and a user turns off the power while the exposure is fixed to the high sensitivity mode or shutter mode, the exposure time when the power is turned on is nearest to FP, namely to the normal exposure time and such malfunction that a bright object is picked up with the longest exposure time or a dark object is picked up with the shortest exposure time can be avoided.

DETAILED DESCRIPTION OF THE PREFERRED EMBODIMENTS

Figure 1:
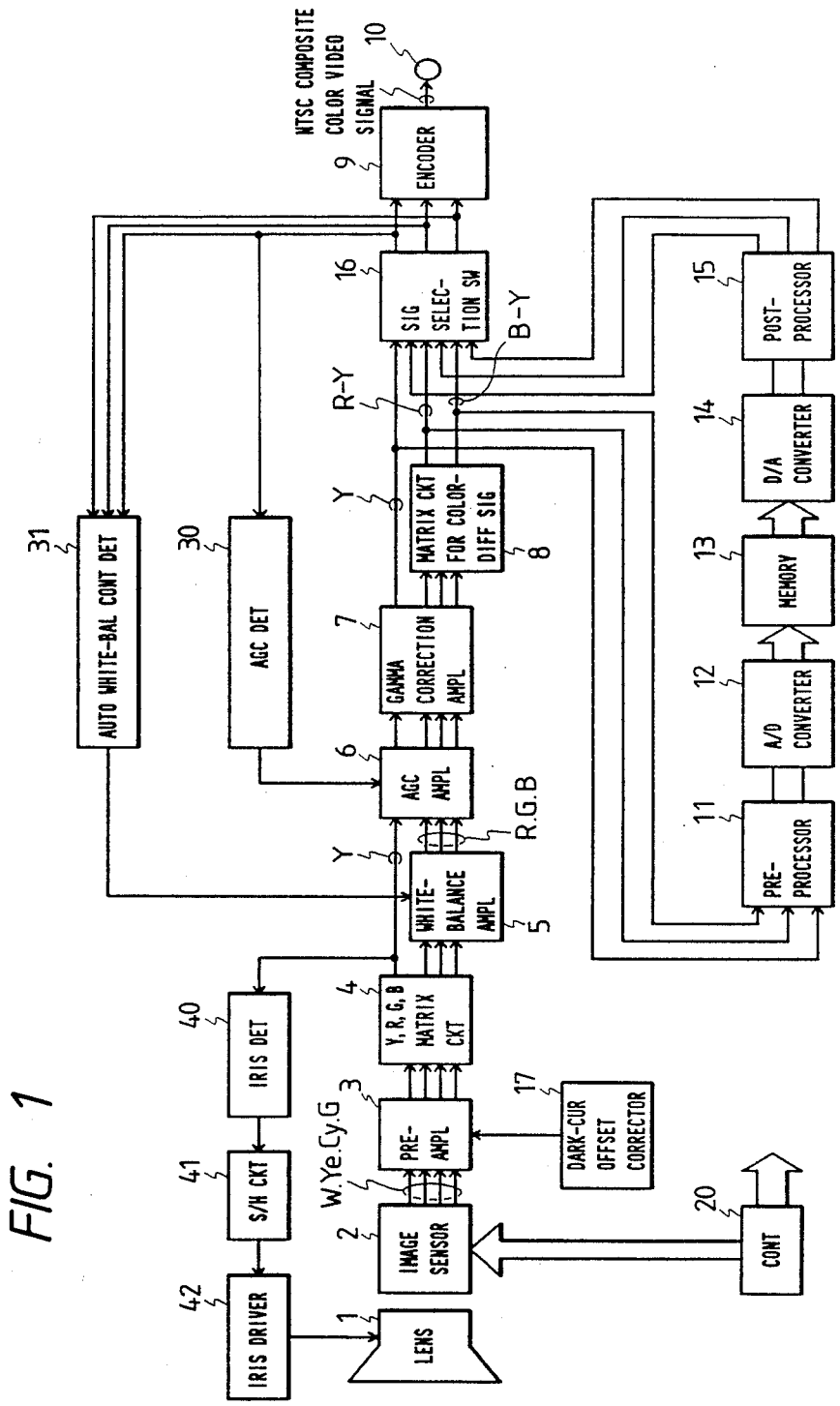
FIG. 1 is a block diagram of a video camera as an embodiment of the present invention.

An embodiment of the present invention will be explained with reference to FIG. 1.

Signals read out from an image sensor 2, in this case, signals W, Ye, Cy, G respectively representing the light having passed a transparent filter (W), an yellow transmitting (Ye), a cyan transmitting (Cy) and a green transmitting (G) filters are amplified by a preamplifier 3 and are then converted to a luminance signal (Y) and three primary colo signals of red (R), green (G), and blue (B) in a matrix circuit 4. Thereafter, the luminance signal and color-difference signals amplified to the standard output level can be obtained through a white-balance amplifier 5, an AGC amplifier 6, a gamma correction amplifier 7 and a matrix circuit 8 for color difference signals, moreover a composite color video signal of NTSC system is obtained by an encoder 9 and this signal is output to a recording apparatus or a display device from a video output terminal 10.

Reference numerals 11 to 15 designate a memory section which converts a video signal, which is intermittently read out from the image sensor 2 in the long exposure mode, to a continuous signal. A preprocessor 11 conducts the processings required for A/D conversion such as amplification, restriction of bandwidth and dot sequantialization for color signals, and an A/D converter 12 conducts quantization of six (6) or eight (8) bit gradation to store the signal in a field memory or frame memory 13. The signal read out from the memory 13 is converted to an analog signal in a D/A converter 14 and is then applied to a signal selection switch 16 through amplification or attenuation, restriction of bandwidth and color separation in a post-processor 15.

The signal selection switch 16 changes over the signals having passed the memory and the signals not passing the memory and then inputs such signals to the encoder 9. A video signal, which has improved the quality even a little, can be obtained by using the outputs of memory section in the long exposure, still picture and stroboscope mode or the signals not passing the memory section in the other mode. The A/D converter 12 and D/A converter 14 show a large power consumption but the power supply of A/D converter 12 and D/A converter 14 can be turned OFF in the ordinary mode by providing the signal selection switch as explained above and thereby interval between battery replacement can be extended by lowering the power consumption.

Since outputs of signal selection switch are input to an AGC detector 30 and a detector 31 for automatic white-balance control (hereinafter abbreviated as "AWB control") among signal level detectors for the automatic signal level control, a continuous signal can also be obtained even in the long exposure mode. Meanwhile, a signal in the stages preceding the AGC amplifier 6 is input to a detector for automatic iris control, namely an iris detector 40, for giving priority to the automatic iris control rather than the AGC. Therefore, the intermittent signal is input to the iris detector 40 in the long exposure mode. Here, a sample and hold (hereinafter abbreviated as "S/H") circuit 41 for converting a detection output to a continuous signal is provided to sample an output signal of iris detector 40 in the field where the signal is read out from the image sensor 2 and hold such sampled signal in the field where the signal is not read out from the image sensor 2. A lens 1 can be controlled to an adequate iris number even in the long exposure mode by controlling an iris driver 42 using the continuous iris detection signal thus obtained.

A controller 20 generates clock pulses required for operating the image sensor 2 and memory section. This controller also supplies a variety of periodical pulse signals to the other signal processing circuits but such flow of pulses is eliminated for simplifying the drawings. A dark-current offset corrector 17 corrects changes of black balance and set-up or dark level.

In an embodiment shown in FIG. 1 explained above, an adequate signal level can be obtained even under the long exposure mode by the automatic control, but since the interval of signals read out from the image sensor 2 becomes longer in the long exposure mode, the response speed of automatic control must be set to a smaller value. Examples of the circuit for changing the response speed will be explained with reference to FIG. 2 and FIG. 3.

Figure 2:
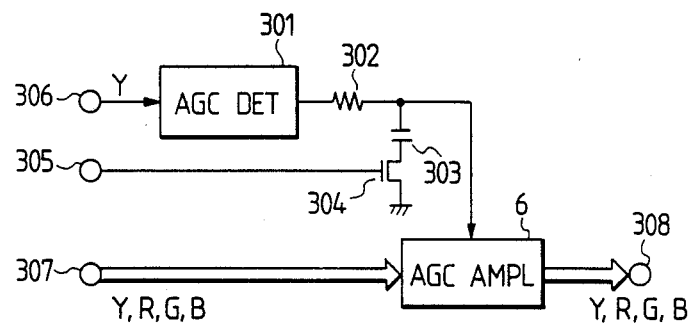
FIG. 2 is a circuit diagram as an example of the AGC circuit in the embodiment shown in FIG. 1.

FIG. 2 is an example of the circuit in relation to the AGC. A reference numeral 306 designates an input terminal of an AGC detector 301; 307, 308, input and output terminals of AGC amplifier 6, respectively. A reference numeral 302 designates a resistor; 303, a capacitor; 304, a transistor; 305, a control terminal of transistor 304. When the transistor 304 becomes conductive, the resistor 302 and capacitor 303 operate as a smoothing circuit. For instance, in case the transistor 304 is an n-channel MOS transistor, response of AGC becomes slow and AGC oscillation does not occur in the long exposure mode by applying a high level voltage to the terminal 305 during the long exposure mode and a low level voltage in the other exposure mode. Namely, in the other exposure mode, the response of AGC becomes quick, and the gain can be changed quickly and adequate output signal level can be attained even if the incident light changes. Moreover, the voltage to be applied to the terminal 305 ma be set to a high level in the field where the signal is not read out from the image sensor. In this case, the response speed can be changed depending on the exposure period in the long exposure mode.

Figure 3:
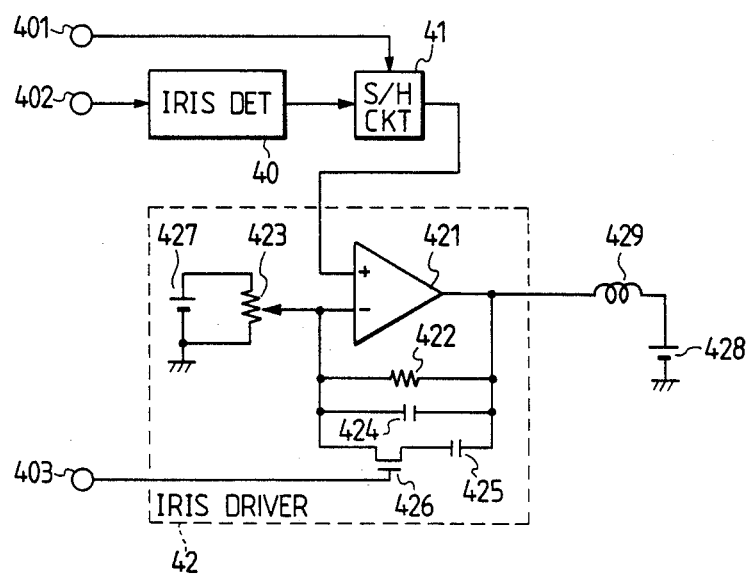
FIG. 3 is a circuit diagram as an example of an automatic iris control circuit in the embodiment shown in FIG. 1.

FIG. 3 is an example of the circuit in relation to the automatic iris control. A reference numeral 401 designates a control terminal of S/H circuit 41; 402, an input terminal of iris detector 40; 421, a differential amplifier; 422, a resistor; 423, a variable resistor; 424, 425, capacitors; 426, a transistor; 403, a control terminal of transistor 426; 427, 428, power sources; 429, a driving coil of iris motor in the lens 1.

To the differential amplifier 421, a reference voltage determined by the variable resistor 423 and an output of S/H circuit 41 are input and an output voltage of amplifier 421 becomes lower and a current flows into the driving coil 429, opening the iris in case the signal level is small and an output voltage of S/H circuit 41 is low. On the contrary, when the signal level is large and the output voltage of S/H circuit 41 is high, the output voltage of amplifier 421 becomes high, a current does not flow into the driving coil 429 and the iris closes with a force of spring provided additionally. Under the condition that the output voltage of S/H circuit 41 becomes almost equal to the reference voltage, the spring force and a force by the driving coil 429 are balanced, stabilizing the iris.

The response speed of this automatic iris control circuit can be changed, for example, by a feedback impedance of the amplifier 421. As shown in the figure, the response of automatic iris control can be made slower when the transistor 426 becomes conductive by forming the feedback loop through serial connection of the capacitor 425 and transistor 426. A voltage to be applied to the control terminal 403 is enough to become high level in the long exposure mode or in the field where the signal is not read out from the image sensor 2, like the control terminal 305 in the example shown in FIG. 2. In the latter case, a pulse to be applied to the terminal 401 is inverted and is then applied to the terminal 403. With the means described above, the response speed of automatic iris control can be lowered only in the long exposure mode s that iris oscillation can be prevented from occurring and high speed automatic iris control can be done in the ordinary image pick-up operation.

Moreover, in the AWB control, the control speed may be lowered only in the long exposure mode with the means similar to that of the examples shown in FIG. 2 and FIG. 3.

Next, an example of the system which may be applied to the embodiment shown in FIG. 1 and essentially prevents iris oscillation will be explained with reference to FIGS. 4 to 7.

Figure 4:
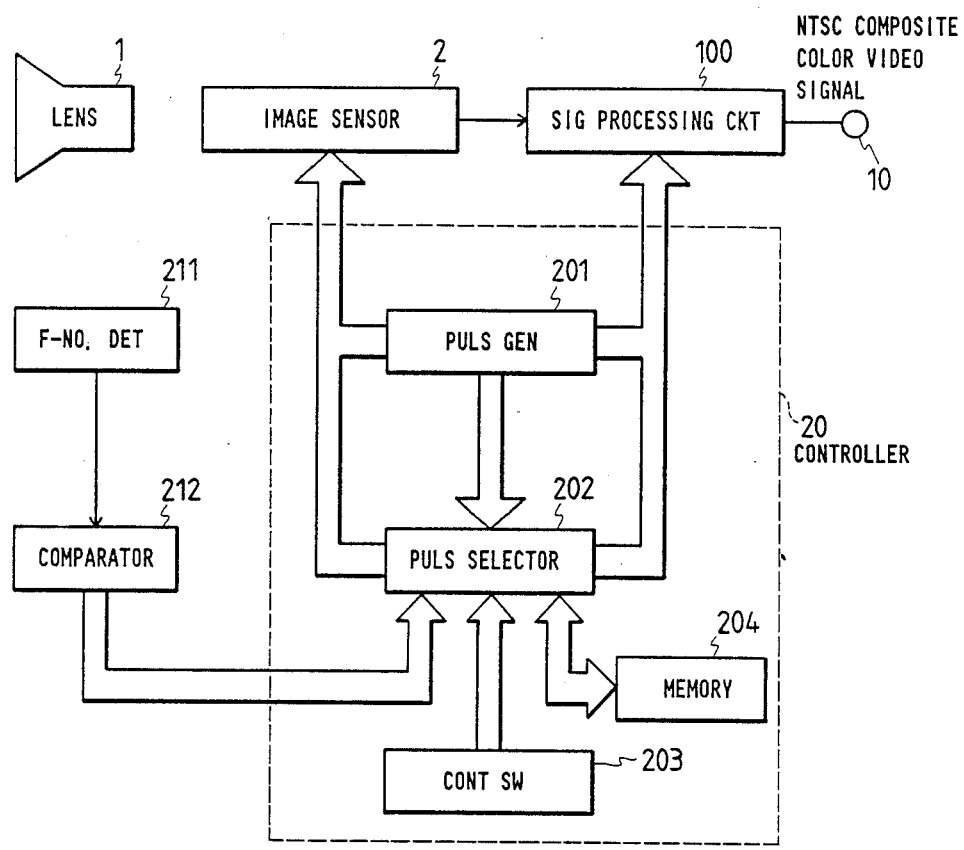
FIG. 4 is a block diagram as an example of an iris oscillation preventing system in the embodiment shown in FIG. 1.

FIG. 4 is a circuit constitution of an example of the iris oscillation preventing system. A reference numeral 100 designates signal processing circuits which converts an output of image sensor 2, for example, to the composite color video signal of the NTSC system and is constituted by the blocks 3-9, 11-17, 30, 40-42 in FIG. 1. 211 designates a circuit for detecting an F-number of lens 1 and is formed, for example, by a Hall device and an amplifier. 212 designates a comparator which compares an output voltage of F-number detector 211 with a predetermined voltage and inputs a result to the controller 20. 203 designates control switches to be operated by users. 204 is a memory storing the preset exposure time. 201 designates a pulse generator; 202, a pulse selector. These supply the necessary drive pulses to the image sensor 2 and the signal processing circuits 100.

Figure 5:
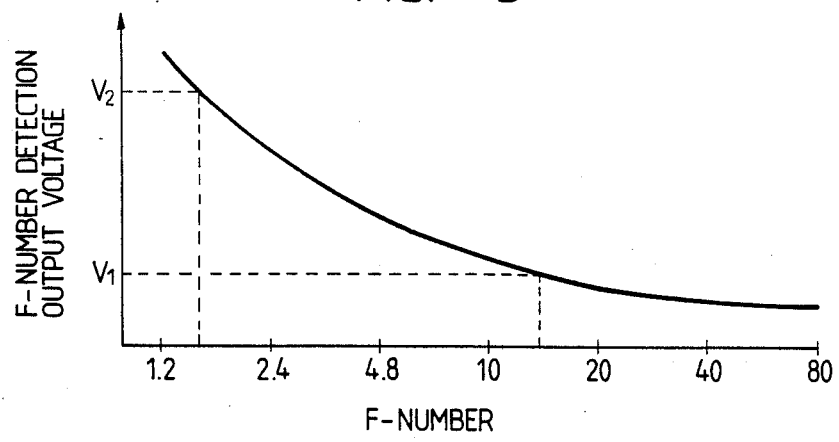
FIG. 5 is a graph of an example of the detection characteristic of the F-number detector shown in FIG. 4.

FIG. 5 is a graph indicating an example of detection characteristic of the F-number detector 211. The comparator 212 selects a voltage $V_1$ corresponding to the condition where the lens is extremely stopped down to the condition represented by the F-number of about 10 and a voltage $V_2$ corresponding to the condition near the opening condition as reference voltages. When the lens is stopped down with entry of intensive light and an output voltage of F-number detector 211 becomes smaller than $V_1$, selection of pulse selector 202 is changed and exposure time becomes short. It means that the exposure time preset by user with the control switches 203 is neglected but it can also be thought to provide larger effect in prevention of iris oscillation. If the output voltage of F-number detector 211 becomes larger than $V_2$ under the condition that the exposure time is shorter than the exposure time preset by user, the exposure time is extended toward that preset by user. Moreover, if the output voltage of the F-number detector 211 exceeds $V_2$ during the exposure time preset by user, an exposure time control function, which makes longer the exposure time than that preset by user, may be added.

Figure 6:
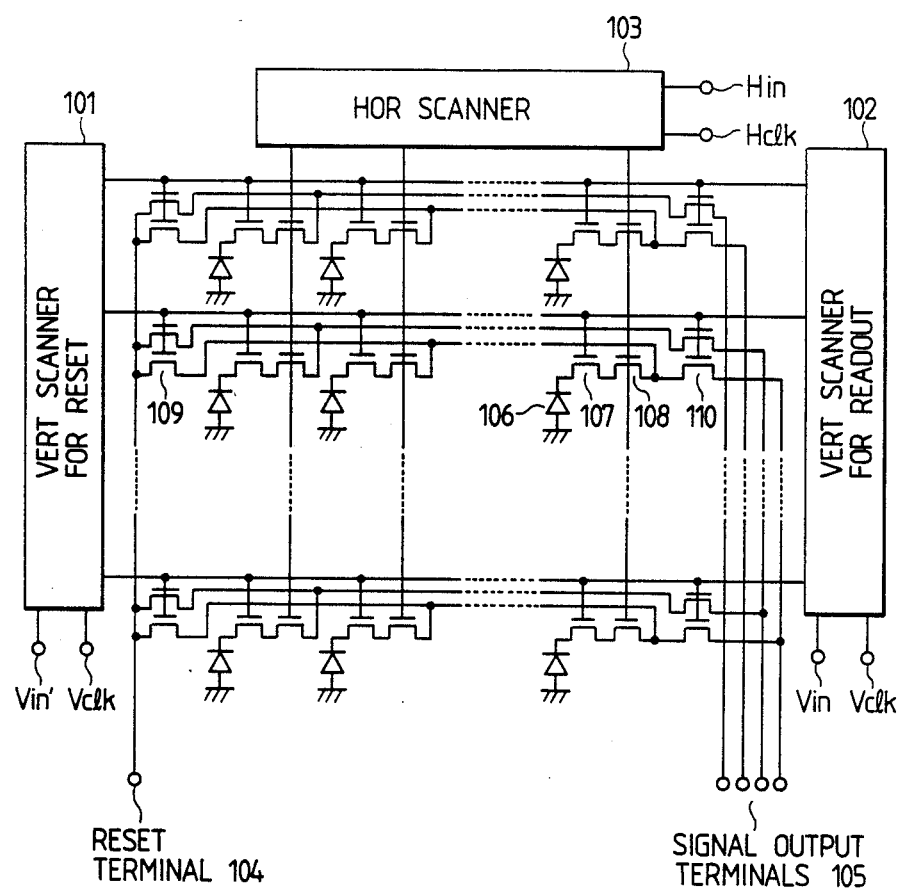
FIG. 6 is a circuit diagram of an example of the image sensor shown in FIG. 1.
Figure 7:
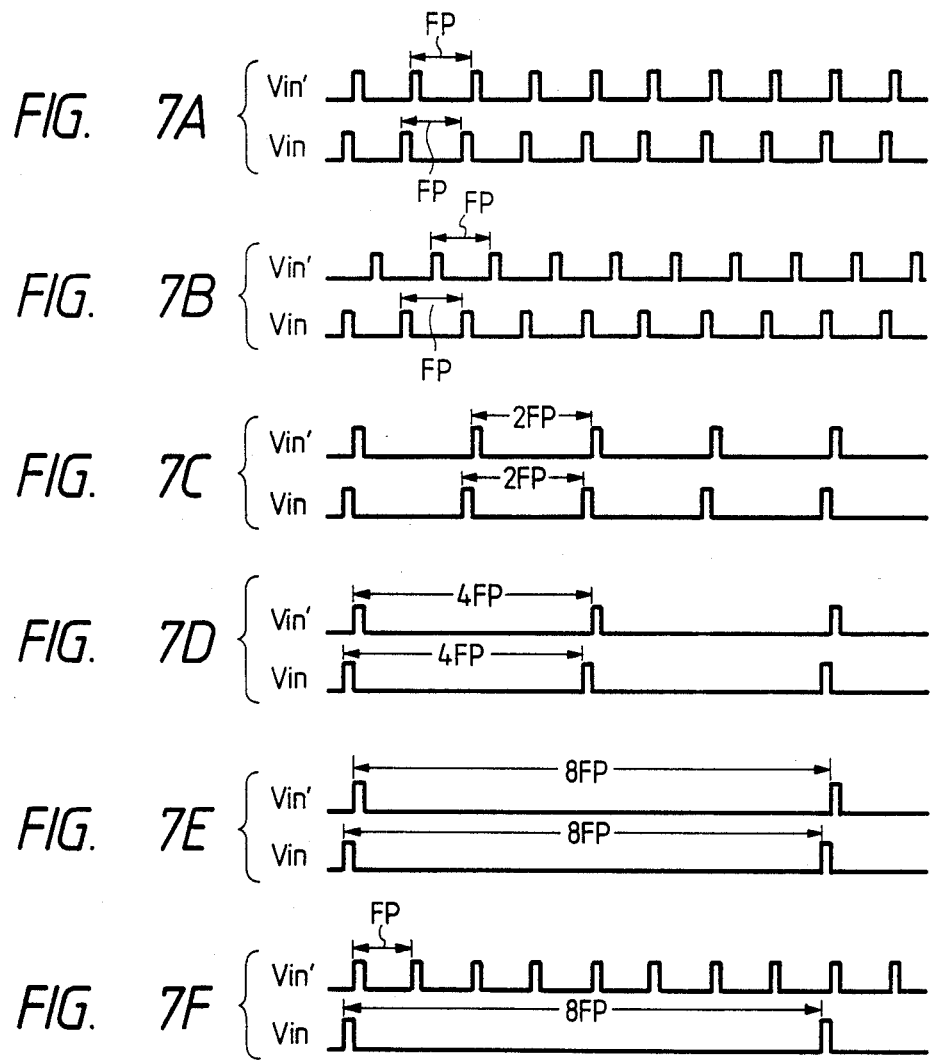
FIGS. 7A, 7B, 7C, 7D, 7E and 7F are timing charts of read start pulses and reset start pulses to be supplied to the image sensor shown in FIG. 6.

FIG. 6 is a circuit diagram as an example of the image sensor 2 and FIG. 7 is a timing chart indicating an example of the drive pulses.

A reference numeral 101 designates a vertical scanner for reset; 102, a vertical scanner for readout; 103, a horizontal scanner; 104, a reset terminal; 105, signal output terminals; 106, a photodiode; 107, a transistor for vertical scanning; 108, a transistor for horizontal scanning; 109, transistors for selecting a row to be reset and 110, transistors for selecting a row to be read. Vin and Vin' respectively represent vertical scanning start pulses for readout and reset. Hin represents a horizontal scanning start pulse for readout; Vclk and Hclk represent clock pulses respectively for driving the vertical scanners 101, 102 and horizontal scanner 103.

In the timing of FIG. 7A, the reset start pulse Vin' appears immediately after (after 1H) the readout start pulse Vin and the exposure time is almost 1FP. FIGS. 7B to 7E respectively indicate examples of the exposure times of FP/2, 2FP, 4FP and 8FP. FIG. 7F indicates an example where the readout interval is 8FP, Vin' appears in the same timing as FIG. 7A and the exposure time is 1FP.

Three concrete examples of the measure for preventing iris oscillation by the exposer time control are indicated hereunder.

In the first example, a measure is applied only to the long exposure time mode. When the F-number voltage becomes smaller than $V_1$ while the exposure time determined by user is 8FP, the exposure time is set to 1FP by changing over Vin' to the timing of FIG. 7F or changing Vin' and Vin to the timing of FIG. 7A. When the F-number voltage becomes larger than $V_2$ because the amount of incident light changes under this condition, the exposure time of 8FP designated by user is set again.

In the second example, a measure is applied only to the long exposure time mode. The exposure time is changed in small steps. When the exposure time designated by user is 4FP, the exposure time becomes 2FP if the F-number voltage becomes smaller than $V_1$. Moreover, when the F-number voltage is smaller than $V_1$, the exposure time is shortened up to 1FP. On the contrary, when the F-number voltage becomes larger than $V_2$, the exposure time is returned to 4FP determined by user in the doubled steps.

In the third example, a measure is applied also to the short exposure time mode. When the F-number voltage becomes lower than $V_1$ even if the exposure time is 1FP, the exposure time becomes shorter and shorter like FP/2, FP/4 . . . . The iris oscillation can then be prevented almost perfectly and a camera employing such measure does not generate iris oscillation, for example, even when the camera picks up the sun in the mid-summer using a telephoto lens.

Thereafter, the other embodiment of the present invention will be explained with reference to FIGS. 8 to 10.

Figure 8:
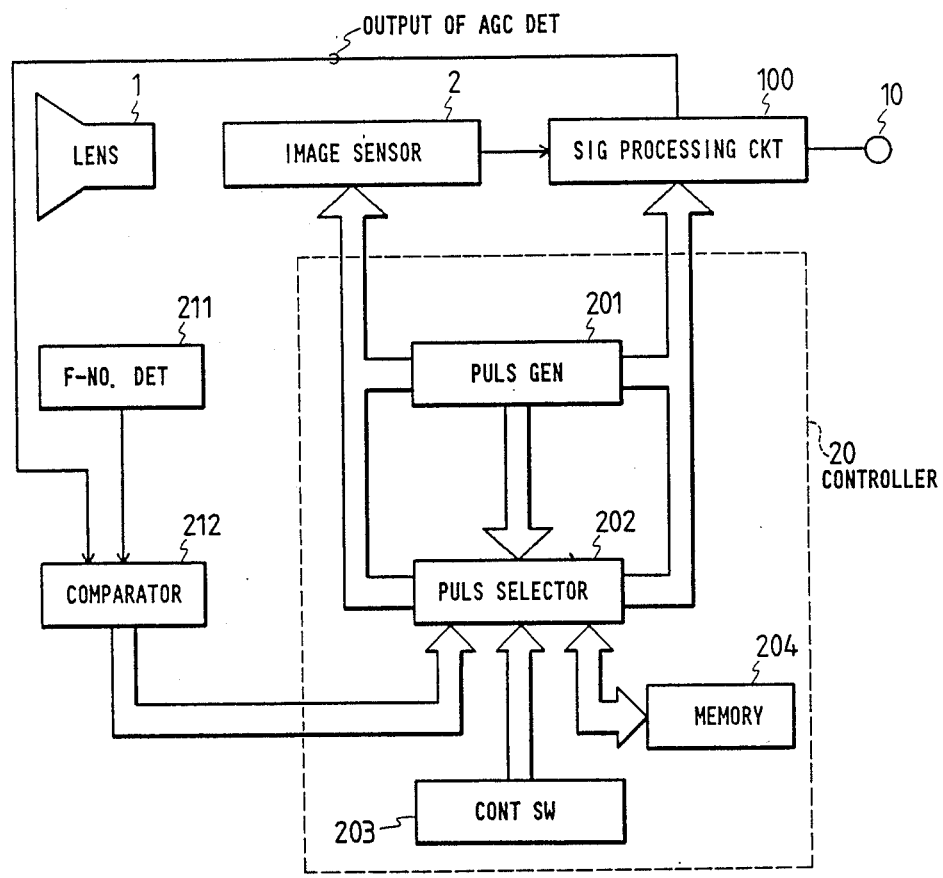
FIG. 8 is a block diagram of an automatic exposure time control system in a video camera as the other embodiment of the present invention.

The embodiment shown in FIG. 8 is similar to an example shown in FIG. 4 in the circuit diagram, but the automatic exposure time control including the long exposure can be controlled by inputting an output of the AGC detector to the comparator 212.

Figure 9:
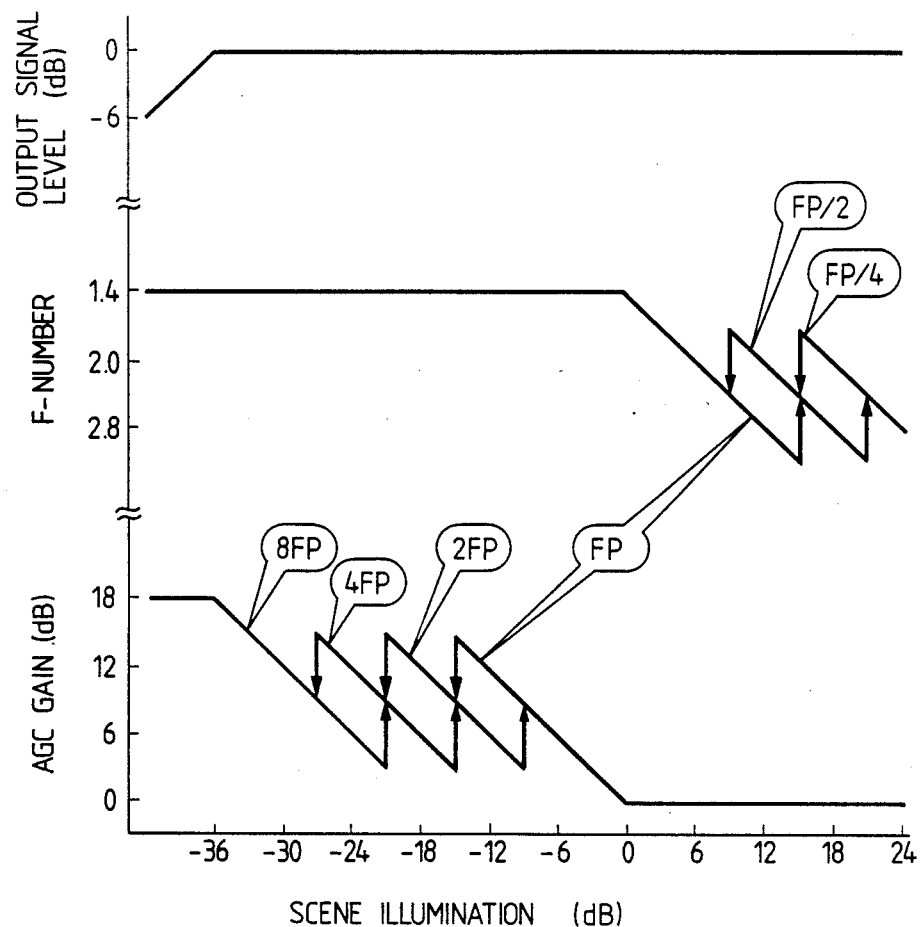
FIG. 9 is a graph of an example of control characteristics of the automatic exposure time control system shown in FIG. 8.

FIG. 9 indicates an example of control characteristics of the automatic exposure control. When the AGC gain exceeds the predetermined level (for example, 15 dB), the exposure time is doubled and on the contrary, when the AGC gain becomes lower than the predetermined level (for example, 3 dB), the exposure time is shortened to ½.

Figure 10A:
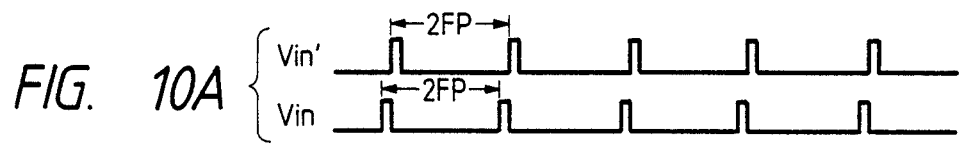
FIGS. 10A, 10B, 10C and 10D are timing charts of read start pulses and reset start pulses in the automatic exposure time control system shown in FIG. 8.
Figure 10B:
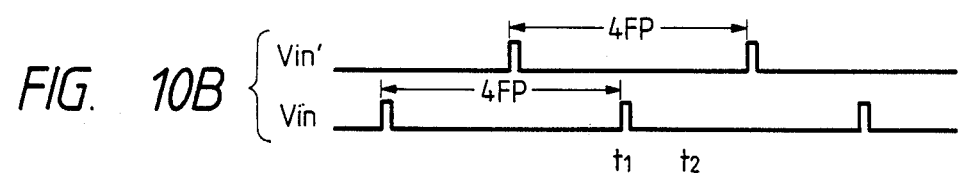
Figure 10C:
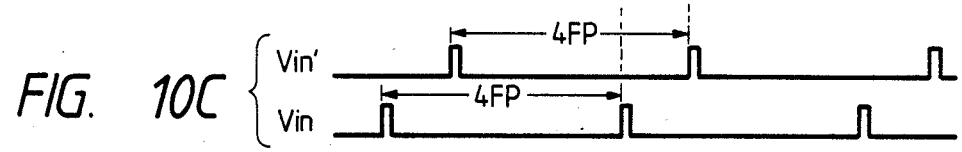
Figure 10D:
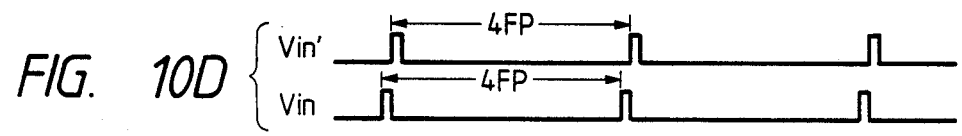

FIGS. 10A to 10D are timing charts of Vin and Vin' and the method for smoothly changing the exposure time will be explained with reference to these figures. FIG. 10A is the timing for 2FP exposure, while FIG. 10D is the timing for 4FP exposure. In case the exposure time is changed to 4FP from 2FP, the timing is first set so that the period is 4FP and exposure time is 2FP as shown in FIG. 10B. Thereafter, the timing of Vin' is hastened as shown in FIG. 10C causing the exposure time to gradually become longer and finally reach the timing of FIG. 10D. The changing to 2FP from 4FP can also be realized in the reverse sequence. Such changing of exposure time realizes smooth automatic exposure time selection.

Figure 10E:
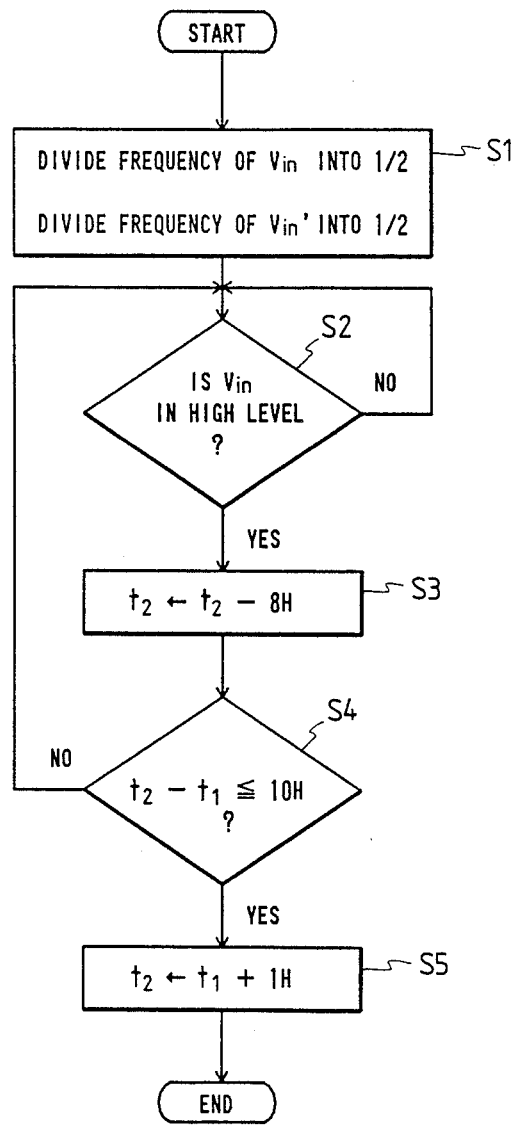
FIG. 10E is a flow chart of procedures to be executed by a microcomputer in such a case as changing the exposure time with a microcomputer.

For such changing of exposure time explained above, it is preferable to use a microcomputer as the pulse selector 202 shown in FIG. 8. FIG. 10E is a flow chart of an example of the procedures for automatically changing the exposure time to be executed by the microcomputer. FIG. 10E shows the procedures for changing the exposure time (2FP) of FIG. 10A to that (4FP) of FIG. 10D.

In FIG. 10E, the frequencies of the readout pulse Vin and the reset pulse Vin' shown in FIG. 10A are respectively divided to ½. In this case, frequency division is carried out in such a manner that the phase of frequency divided reset pulse Vin' is different from the phase of frequency-divided readout pulse Vin almost by 180° as shown in FIG. 10B (step S1).

Next, the timing is decided whether the level of readout pulse Vin is in the high or not. When the result of decision is YES, namely when the timing is in the readout period, processing advances to the next step. But, if the result is NO, such decision is repeated until the result becomes YES (step S2).

In the step S3, the rising time $t_2$ of reset pulse Vin' is hastened only by 8H.

Thereafter, it is decided whether difference of rising times $t_2-t_1$ of the reset pulse and readout pulse is equal to 10H or is smaller than 10H. When the result is YES, processing advances to the next step but, if the result is NO, processing returns to the step S2 (step S4). Namely, the rising time $t_2$ of reset pulse Vin' is hastened by 8H for field by field until the decision formula of step S4 is satisfied.

When the result of decision in the step S4 is YES, processing advances to the step S5. Namely, the rising time $t_2$ of reset pulse Vin' is hastened so that it is delayed by 1H from the rising time $t_1$ of readout pulse (step S5).

With such procedures, the pulses Vin, Vin' shown in FIG. 10D can be obtained from the pulses Vin, Vin' shown in FIG. 10A. As explained above, when the rising time of reset pulse Vin' is changed so that it is hastened by an integer time of horizontal scanning period H for each field, the exposure time can be changed smoothly to 4FP from 2FP without generating any disturbance in the image picked up by camera.

Next, an embodiment considering the control switches operated by user will be explained with reference to FIGS. 11 to 17.

Figure 11:
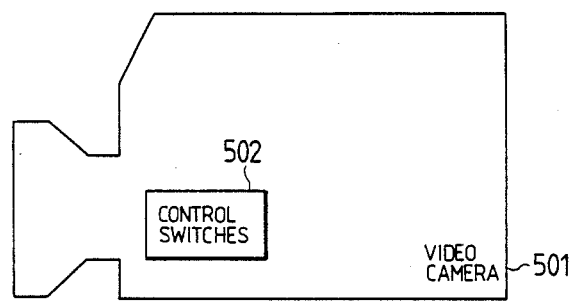
FIG. 11 is a schematic outline view of a video camera to which the present invention is applied.

FIG. 11 is a schematic outline view of an example of the video camera according to the present invention. Usually, control switches 502 to be operated by user is provided at the position indicated in the figure. The control switches 502 corresponds to the control switches 203 shown in FIG. 4 and FIG. 8.

Figure 12:
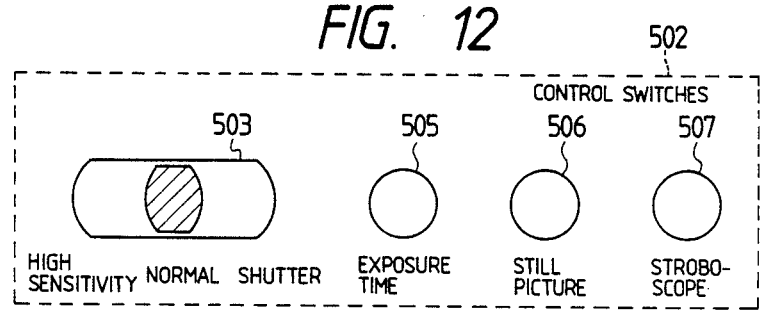
FIG. 12 shows a layout of control switches of video camera shown in FIG. 11.

An embodiment of the control switch 502 is shown in FIG. 12. A reference numeral 503 designates a slide switch for mode selection; 505, a push switch for changing exposure time. Since the video camera includes the field memory or frame memory, it is also provided with a switch 506 for still picture and a switch 507 for stroboscope action. The slide switch 503 provides the normal mode giving the exposure time of 1FP at the neutral point and the high sensitivity mode giving long exposure and the shutter mode giving short exposure at both sides. Here, it should be noted that the exposure time switch 505 is used in common in the right and left modes and this switch provides the merit that function of switch can be understood clearly for user and the desired exposure time can be set quickly depending on the purposes.

Figure 13:
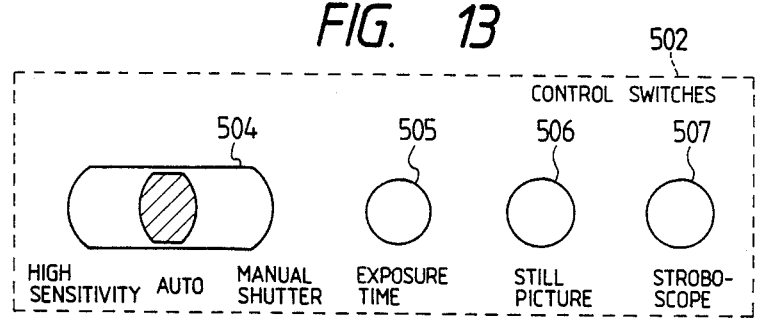
FIG. 13 shows the other layout of control switches of video camera shown in FIG. 11.

FIG. 13 is a schematic outline view of control switches as the other embodiment of the present invention. This embodiment is different from that shown in FIG. 12 in such a point that the neutral point of slide switch 504 provides the automatic exposure time control mode.

Figure 14:
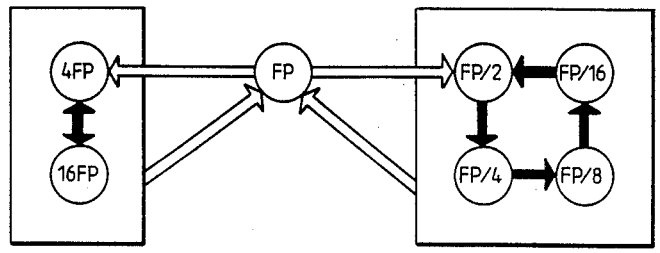
FIG. 14 and FIG. 15 show transition of exposure time controlled by the control switches shown in FIG. 12.
Figure 15:
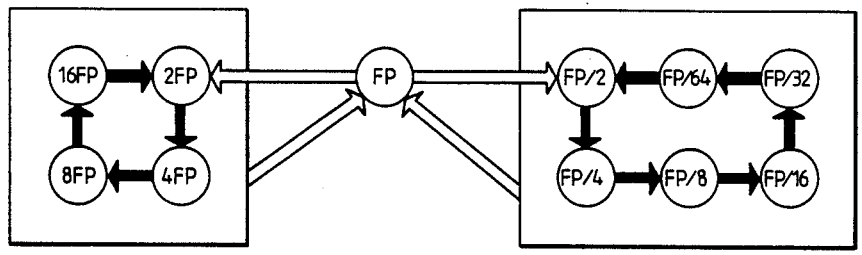
Figure 16:
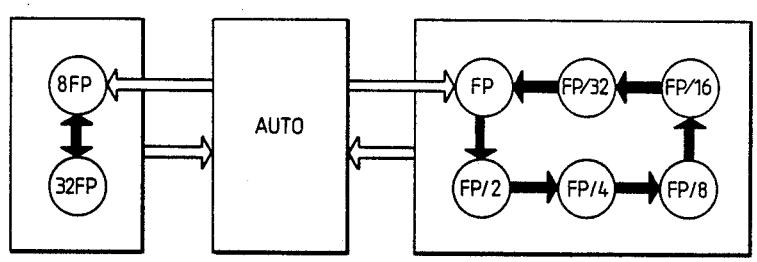
FIG. 16 and FIG. 17 show transition of exposure time controlled by the control switches shown in FIG. 13.
Figure 17:
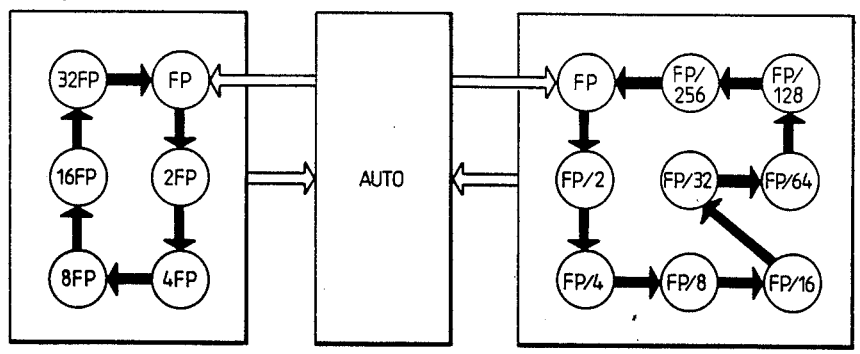

FIG. 14 and FIG. 15 respectively show actual examples of exposure time control by the control switches shown in FIG. 12, while FIG. 16 and FIG. 17 show actual examples of exposure time control by the control switches shown in FIG. 13. The arrow marks(white) indicate transition of exposure time by the slide switch 503 or 504 for mode selection, while the arrow marks (black) indicate transition of exposure time by the push switch 505. These examples are characterized in that the exposure time preset first when the mode selection slide switch is set to both right and left sides is nearest to the normal exposure time 1FP and thereby if the power is turned OFF while the slide switches 503, 504 are set to any one of right and left side, the image pickup can be started with the setting near the normal exposure time of 1FP when the power is turned ON next. Namely, such control switches are provided as the failsafe facility.

We claim:

1. An image pick up apparatus comprising:
   an image sensor for converting a projected light image to an electrical signal;
   signal level adjusting means for adjusting a level of signal read out from said image sensor;
   a detector for detecting the level of signal read out from said image sensor and supplying an automatic level control signal based on the result of detection to said signal level adjusting means so as to keep the level of signal read out from said image sensor at a predetermined value;
   exposure time setting means for setting an exposure time for said image sensor to either one of a normal exposure time and an exposure time longer than the normal exposure time; and
   means for lowering a response speed of said signal level adjusting means to said automatic level control signal supplied from said detector, when said exposure time is set to a time longer than said normal exposure time, lower than the response speed preset when the exposure time is set to said normal exposure time.

2. An image pick-up apparatus comprising:
   an image sensor for converting a projected light image to an electrical signal;
   a variable gain amplifier for amplifying a signal delivered out of said image sensor;
   a detector for detecting an output signal level of said amplifier and supplying a gain control signal based on the result of detection to said amplifier so as to keep the level of output signal of said amplifier to a predetermined value;
   exposure time setting means for setting an exposure time for said image sensor to either one of a normal exposure time and an exposure time longer than the normal exposure time; and
   means for lowering, when said exposure time is set to a time longer than said normal exposure time, a response speed of said amplifier to said gain control signal supplied from said detector lower than the response speed preset when the exposure time is set to said normal exposure time.

3. An image pick-up apparatus according to claim 2, wherein said means for lowering said response speed is formed as a circuit for changing time constant of an output circuit of said detector.

4. An image pick-up apparatus according to claim 2, wherein said means for lowering said response speed comprises a smoothing circuit and a switching element for connecting the smoothing circuit to an output circuit of said detector.

5. An image pick-up apparatus comprising:
an image sensor for converting a projected light image to an electrical signal;
an iris device for adjusting amount of light which is incident to said image sensor;
a detector for detecting a level of signal read out from said image sensor and supplying an automatic iris control signal based on the result of detection to said iris device so as to keep the level of signal read out from said image sensor to a predetermined value;
exposure time setting means for setting an exposure time for said image sensor to either one of a normal exposure time and an exposure time longer than the normal exposure time; and
means for lowering, when said exposure time is set to an exposure time longer than said normal exposure time, a response speed of said iris device to said automatic iris control signal supplied from said detector lower than the response speed preset when said exposure time is set to said normal exposure time.

6. An image pick-up apparatus according to claim 5, wherein said means for lowering the response speed of said iris device is formed as a circuit for changing a feedback impedance of an amplifier included in said iris device.

7. An image pick-up apparatus according to claim 5, wherein said means for lowering the response speed of said iris device comprises a capacitor and a switching element for connecting the capacitor to a feedback impedance of an amplifier included in said iris device.

8. An image pick-up apparatus comprising:
an image sensor for converting a projected light image into an electrical signal;
signal level adjusting means for adjusting a level of output signal of said image sensor;
a detector for detecting the output signal level of said image sensor and outputting a detection signal;
a sample and hold circuit for sampling and holding said detection signal and supplying a hold value to said signal level adjusting means as a level control signal so as to keep the level of output signal of said image sensor to a predetermined value; and
exposure time setting means for setting an exposure time for said image sensor to either one of a normal exposure time and an exposure time longer than the normal exposure time.

9. An image pick-up apparatus according to claim 8, wherein said sample and hold circuit samples and holds a detection signal delivered out of said detector in the field in which a signal is read out from said image sensor and supplies a hold value as the level control signal to said signal level adjusting means in the field where a signal is not read out from said image sensor.

10. An image pick-up apparatus according to claim 8, wherein said signal level adjusting means is formed as an automatic iris device which is controlled based on the hold value of said sample and hold circuit.

11. An image pick-up apparatus comprising:
an image sensor for converting a projected light image into an electrical signal;
exposure time setting means for setting an exposure time for said image sensor to either one of a normal exposure time and an exposure time different from the normal exposure time;
means for setting said exposure time setting means in accordance with operations by an operator in such a manner that said exposure time setting means sets the exposure time which the operator desires;
automatic iris control means;
means for detecting an iris value of said automatic iris control means; and
means for controlling said exposure time setting means so as to make the exposure time for said image sensor shorter than said exposure time preset by the operator in such a case that the detected iris value exceeds a predetermined value.

12. An image pick-up apparatus according to claim 11, wherein said exposure time setting means is controlled so as to make the exposure time for said image sensor shorter than said exposure time set by the operator only when said exposure time preset by the operator is longer than said normal exposure time.

13. An image pick-up apparatus comprising:
an image sensor for converting a projected light image to an electrical signal;
exposure time setting means for setting an exposure time for said image sensor to either one of a normal exposure time and an exposure time different from the normal exposure time;
means for setting said exposure time setting means in accordance with operations by an operator in such a manner that said exposure time setting means sets the exposure time which the operator desires;
automatic iris control means;
means for detecting an iris value of said automatic iris control means; and
means for controlling said exposure time setting means so as to make the exposure time for said image sensor longer than said exposure time preset by the operator in such a case that the detected iris value becomes smaller than a predetermined value.

14. An image pick-up apparatus comprising:
an image sensor for converting a projected light image into an electrical signal;
exposure time setting means for setting the exposure time for said image sensor to either one of a normal exposure time and an exposure time different from the normal exposure time;
means for setting said exposure time setting means in accordance with operations by an operator in such a manner that said exposure time setting means sets the exposure time which the operator desires;
automatic iris control means;
means for detecting an iris value of said automatic iris control means; and
means for controlling said exposure time setting means in such a manner that the exposure time for said image sensor is made shorter than said exposure time preset by the operator when the detected iris value has exceeded a first predetermined value and the exposure time for said image sensor is made longer than said exposure time preset by the operator when the detected iris value has become smaller than a second predetermined value.

15. An image pick-up apparatus according to claim 14, wherein said exposure time setting means is controlled so as to make the exposure time for said image sensor shorter than said exposure time preset by the operator only when said exposure time preset by the operator is longer than said normal exposure time.

16. An image pick-up apparatus comprising:
an image sensor for converting a projected light image into an electrical signal;

automatic gain control means including a variable gain amplifier for amplifying a signal delivered out of said image sensor, and a detector for detecting an output signal level of the amplifier and supplying a gain control signal based on the result of detection to the amplifier so as to keep the level of output signal of the amplifier to a predetermined value;

exposure time setting means for setting an exposure time for said image sensor to either one of a normal exposure time and an exposure time longer than the normal exposure time;

means for detecting a gain of said automatic gain control means; and means for controlling said exposure time setting means so as to make the exposure time for said image sensor longer than a preset exposure time when the detected gain value has exceeded a predetermined value.

17. An image pick-up apparatus according to claim 16, wherein said exposure time setting means is controlled so as to change the preset exposure time with such a small time step as an integer time of one horizontal scanning period.

18. An image pick-up apparatus comprising:

an image sensor for converting a projected light image into an electrical signal;

automatic gain control means including a variable amplifier for amplifying a signal delivered out of said image sensor, and a detector for detecting an output signal level of the amplifier and supplying a gain control signal based on the result of detection so as to keep the level of output signal of the amplifier to a predetermined value;

exposure time setting means for setting an exposure time for said image sensor to either one of a normal exposure time and an exposure time shorter than the normal exposure time;

means for detecting a gain of said automatic gain control means; and means for controlling said exposure time setting means so as to make the exposure time for said image sensor shorter than a preset exposure time when the detected gain value has become smaller than a predetermined value.

19. An image pick-up apparatus according to claim 18, wherein said exposure time setting means is controlled so as to change the preset exposure time with such a small time step as an integer time of one horizontal scanning period.

20. An image pick-up apparatus comprising:

an image sensor for converting a projected light image into an electrical signal;

automatic gain control means including a variable gain amplifier for amplifying a signal delivered out of said image sensor, and a detector for detecting an output signal level of the amplifier and supplying a gain control signal based on the result of detection to the amplifier so as to keep the output signal level of the amplifier to a predetermined value;

exposure time setting means for setting an exposure time for said image sensor to either one of a normal exposure time and an exposure time longer or shorter than the normal exposure time;

means for detecting a gain of said automatic gain control means; and means for controlling said exposure time setting means in such a manner that the exposure time for said image sensor is made longer than a preset exposure time when the detected gain value has exceeded a first predetermined value and the exposure time for said image sensor is made shorter than the preset exposure time when the detected gain value has become shorter than a second predetermined value.

21. An image pick up apparatus according to claim 20, wherein said exposure time setting means is controlled so as to change the preset exposure time with such a small time step as an integer time of one horizontal scanning period.

22. An image pick-up apparatus comprising:

an image sensor for converting a projected light image into an electrical signal;

exposure time setting means for setting an exposure time for said image sensor to either one of a normal exposure time and an exposure time longer or shorter than the normal exposure time;

a first switch for selecting either one of a long exposure mode longer than said normal exposure time and a short exposure mode shorter than said normal exposure time; and a second switch to be used in common for said two exposure modes in order to change the exposure time.

23. An image pick-up apparatus according to claim 22, wherein an exposure time to be set at the first time is the shortest exposure time among the setable exposure times when said long exposure mode is selected, and an exposure time to be set at the first time is the longest exposure time among the setable exposure times when said short exposure mode is selected.

* * * * *